(12) United States Patent
Olsommer et al.

(10) Patent No.: US 9,475,546 B2
(45) Date of Patent: Oct. 25, 2016

(54) ELECTRICAL ASSISTANCE DEVICE FOR A BICYCLE AND ELECTRICALLY ASSISTED BICYCLE PROVIDED WITH SUCH A DEVICE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: David Olsommer, Clermont-Ferrand (FR); Olivier Essinger, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 0 days.

(21) Appl. No.: 14/649,960

(22) PCT Filed: Dec. 2, 2013

(86) PCT No.: PCT/EP2013/075278
§ 371 (c)(1),
(2) Date: Jun. 5, 2015

(87) PCT Pub. No.: WO2014/086728
PCT Pub. Date: Jun. 12, 2014

(65) Prior Publication Data
US 2015/0314829 A1    Nov. 5, 2015

(30) Foreign Application Priority Data
Dec. 5, 2012  (FR) ..................... 12 61632

(51) Int. Cl.
*B62M 6/75*    (2010.01)
*B60C 13/02*   (2006.01)

(52) U.S. Cl.
CPC ............... *B62M 6/75* (2013.01); *B60C 13/02* (2013.01)

(58) Field of Classification Search
CPC ....... B62M 6/75; B62M 13/00; B62M 13/04
See application file for complete search history.

(56) References Cited

U.S. PATENT DOCUMENTS 1,158,311 A * 10/1915 Schunk .................... B62M 6/75
                                                        180/205.7
1,203,927 A * 11/1916 Stagni ...................... B62M 7/10
                                                        180/222

(Continued)

FOREIGN PATENT DOCUMENTS

DE    32 34 729 A1    3/1984
DE    299 22 683 U1   4/2000

(Continued)

OTHER PUBLICATIONS

Machine Translation of DE 3234729 printed Nov. 24, 2015.*

*Primary Examiner* — Tony Winner
*Assistant Examiner* — Gabriela C Craciun
(74) *Attorney, Agent, or Firm* — Fitzpatrick, Cella, Harper & Scinto

(57) ABSTRACT

An electrical assist device is provided for a bicycle. The device includes an electric machine, a drive pinion, an attachment device, a source of electrical energy, and a controller. The attachment device fixes the electric machine to the bicycle near a tire of a wheel of the bicycle. The source of electrical energy powers the electric machine. The controller controls the electric machine. The electric machine includes a rotor, which drives the drive pinion. The drive pinion includes helicoidal teeth structured to mesh tangentially with complementary teeth fastened to the tire.

14 Claims, 6 Drawing Sheets

(56) References Cited

U.S. PATENT DOCUMENTS

| | | | | |
|---|---|---|---|---|
| 1,369,015 A * | 2/1921 | Evans | B62M 7/10 | 180/222 |
| 1,517,338 A * | 12/1924 | Bessiere | B62M 7/10 | 180/222 |
| 3,237,475 A * | 3/1966 | Mattson | F16H 1/145 | 74/457 |
| 3,431,994 A * | 3/1969 | Wood, Jr. | B62M 6/75 | 180/206.8 |
| 3,841,428 A * | 10/1974 | Bialek | B62M 13/04 | 180/220 |
| 3,878,737 A * | 4/1975 | Schulz | B62M 11/14 | 192/217.3 |
| 3,978,936 A * | 9/1976 | Schwartz | B62M 6/75 | 180/206.8 |
| 4,060,007 A * | 11/1977 | Levesque | B23F 15/06 | 192/108 |
| 4,276,785 A * | 7/1981 | Rouverol | F16H 55/0806 | 74/457 |
| 4,418,784 A * | 12/1983 | Fox | F02B 75/34 | 180/221 |
| 4,776,224 A * | 10/1988 | Maezawa | F02N 15/06 | 74/457 |
| 5,288,556 A * | 2/1994 | Lemelson | B01J 8/42 | 428/216 |
| 5,423,393 A * | 6/1995 | Felt | B62M 13/04 | 180/221 |
| 5,735,363 A * | 4/1998 | Horovitz | A61G 5/045 | 180/206.8 |
| 5,842,535 A * | 12/1998 | Dennis | B62M 13/00 | 180/206.8 |
| 6,273,205 B1 * | 8/2001 | Tsai | B62M 6/75 | 180/181 |
| 6,732,606 B1 * | 5/2004 | Zhu | F16H 55/06 | 74/421 R |
| 7,490,646 B2 * | 2/2009 | Bogenschuetz | B60C 11/13 | 152/209.21 |
| 7,581,463 B2 * | 9/2009 | Jacobs | F16H 19/001 | 74/406 |
| 7,640,822 B2 * | 1/2010 | Suzuki | F16H 55/22 | 74/425 |
| 8,100,208 B2 * | 1/2012 | Jordan | B62M 6/65 | 180/220 |
| 8,151,924 B2 * | 4/2012 | Radtke | B62M 6/45 | 180/206.1 |
| 8,857,544 B2 * | 10/2014 | Essinger | B64C 25/405 | 180/65.51 |
| 8,967,012 B2 * | 3/2015 | Napau | F16H 55/082 | 74/457 |
| 2002/0000339 A1 * | 1/2002 | Tsai | B62K 3/002 | 180/65.1 |
| 2005/0113202 A1 * | 5/2005 | Miller | B62D 5/0409 | 475/215 |
| 2005/0274216 A1 * | 12/2005 | Fleytman | F16H 1/08 | 74/457 |
| 2011/0056177 A1 * | 3/2011 | Goto | B62M 6/55 | 56/14.7 |
| 2011/0226077 A1 * | 9/2011 | Eitan | F16H 3/42 | 74/457 |
| 2012/0217340 A1 * | 8/2012 | Essinger | B64C 25/405 | 244/50 |
| 2012/0226400 A1 * | 9/2012 | Hsu | B62M 6/45 | 701/22 |
| 2012/0322594 A1 * | 12/2012 | Kitamura | B62J 6/06 | 474/110 |
| 2013/0241170 A1 * | 9/2013 | Talavasek | B62M 6/90 | 280/279 |

FOREIGN PATENT DOCUMENTS

| | | |
|---|---|---|
| DE | 20 314 210 U1 | 1/2004 |
| DE | 20 2010 012 992 U1 | 4/2011 |
| DE | 10 2010 039 860 A1 | 3/2012 |
| GB | 2 145 384 A | 3/1985 |
| WO | WO 00/40457 A1 | 7/2000 |

* cited by examiner

ELECTRICAL ASSISTANCE DEVICE FOR A BICYCLE AND ELECTRICALLY ASSISTED BICYCLE PROVIDED WITH SUCH A DEVICE

FIELD OF THE INVENTION

The present invention concerns electric assist devices for bicycles and bicycles equipped with such devices.

RELATED ART

In this field, a certain number of devices available on the market are known.

Some of these devices use an electric machine placed in the hub of one of the wheels of the bicycle. This electric machine drives the wheel directly or via a reducer system. This type of device has the disadvantage of a high mass, this mass being moreover located at the level of the wheel, which means that the cyclist is very sensitive to it. Moreover, if the wheel must be removed, for example to change the tire or to repair a puncture, removing the wheel is complicated by the presence of electrical connections that are necessary for powering the electric machine and specific fixings of the hub that are necessary to transfer the drive torque.

Other devices use a motor-gearbox driving the pedals of the bicycle and therefore using the existing transmission of the bicycle. This type of device has the disadvantage of deeply impacting the architecture of the bicycle so that in particular the frames of the bicycles must be specifically designed to accommodate these devices.

The document DE-20314210-U1 describes a principle of driving a bicycle by an electric motor in which a drive pinion meshes with teeth fastened to the front rim of the bicycle, said teeth being internal teeth, i.e. the teeth point toward the wheel axis. A disadvantage of this system is that the teeth on the rim are liable to retain stones.

BRIEF DESCRIPTION OF EMBODIMENTS OF THE INVENTION

An object of the invention is therefore to propose an electric assist device for a bicycle as well as a bicycle equipped with said device that eliminate some or all of these problems.

To this end the invention proposes an electrical assist device for a bicycle, said device comprising:
 an electric machine comprising a rotor,
 a drive pinion driven by the rotor of the electric machine,
 fixing means for fixing the electric machine to the bicycle in the vicinity of a tire of a wheel of said bicycle,
 a source of electrical energy for powering the electric machine,
 means for controlling the electric machine,
said device being characterized in that the drive pinion includes teeth intended to mesh tangentially with complementary teeth fastened to said tire, the teeth of the drive pinion being helicoidal teeth.

This type of transmission using pinions and teeth is referred to as "positive" transmission in contrast to friction transmission systems such as roller systems. A positive transmission is not dependent on the coefficient of friction and therefore relatively insensitive to inclement weather or to wear of the components used.

The electric machine is preferably a permanent magnet brushless three-phase synchronous motor. The rotor is preferably an external rotor.

The teeth of the drive pinion are preferably asymmetrical teeth comprising driving faces and non-driving faces, the aperture angle of the driving faces being smaller than the aperture angle of the non-driving faces.

The drive pinion is preferably driven by the electric machine via a freewheel mechanism so that the tire does not drive the electric machine when the bicycle is moving forward.

Said device more preferably further comprises a display and control unit connected to the control means of the electric machine and adapted to constitute an interface between the cyclist and the control means.

Said device more preferably further comprises a pedalling sensor connected to the control means of the electric machine.

The fixing means more preferably comprise an oscillating arm articulated to a support, the support being intended to be fastened to the bicycle and the oscillating arm carrying the electric machine so that the drive force transmitted to the tire by the drive pinion generates an additional radial pressure in the gears.

Elastic means more preferably prestress the orientation of the oscillating arm so that, in the absence of drive force, the drive pinion presses radially against the tire with a non-zero bearing force.

The fixing means more preferably define at least two positions of the electric machine relative to the tire, said at least two positions comprising a working position in which the drive pinion meshes with the teeth of the tire and a folded position in which the drive pinion is held away from the tire.

The invention also concerns an electric assist kit for a bicycle comprising the electric assist device as described above, said electric assist kit further comprising a tire, said tire being a pneumatic tire including said complementary teeth.

Said complementary teeth are preferably placed on a flank of the pneumatic tire.

Said complementary teeth are more preferably asymmetric teeth comprising driving faces and non-driving faces, the aperture angle of the driving faces being smaller than the aperture angle of the non-driving faces.

The pitch of the complementary teeth is more preferably between 1.8 mm and 5.5 mm and preferably between 1.8 mm and 2.5 mm.

The invention also concerns a bicycle with electric assistance comprising an electric assist kit as described above.

The electric assist kit is preferably installed on the rear wheel of the bicycle.

BRIEF DESCRIPTION OF THE DRAWINGS

Other features and advantages of the invention will become apparent thanks to the description of preferred embodiments. The figures respectively represent.

The figures represent different general and detailed views of preferred embodiments of an electric assist device and an electrically assisted bicycle in accordance with the invention. In the various figures, identical or similar elements bear identical references. The references are not systematically repeated in each figure in order to simplify the understanding of the drawings.

DETAILED DESCRIPTION OF EMBODIMENTS OF THE INVENTION

Figure 1:
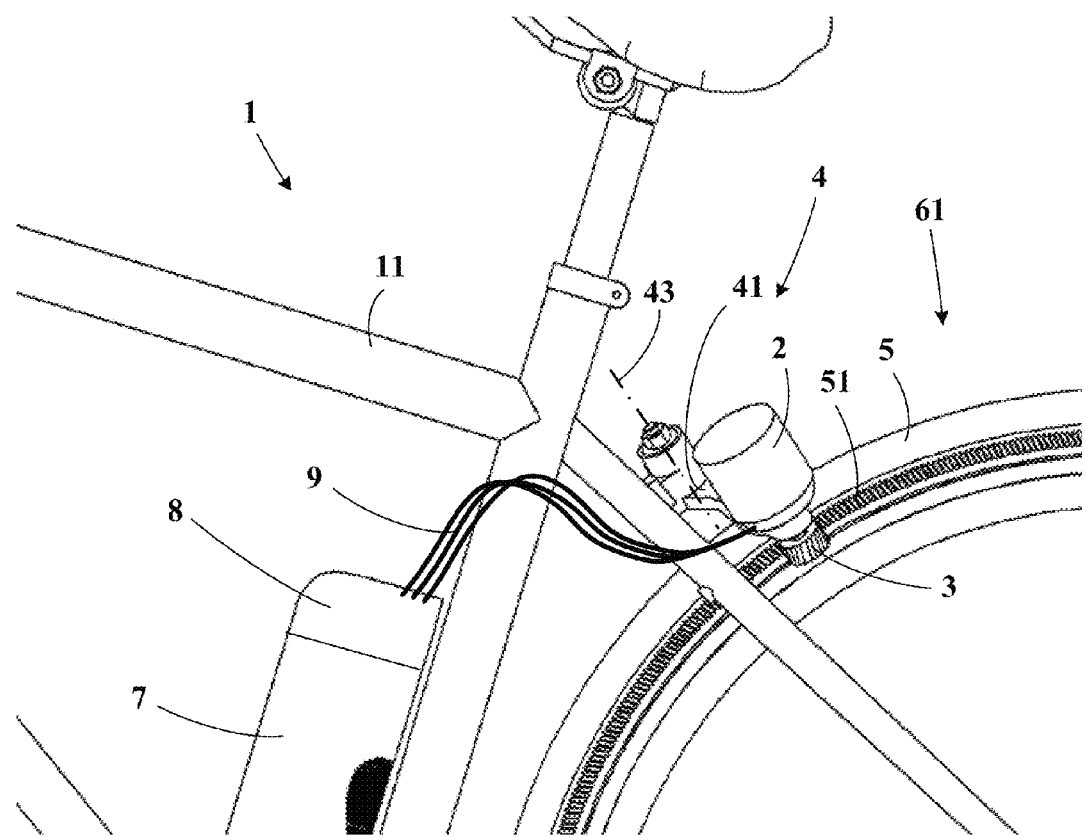
FIG. 1: diagrammatic side view of an electrically assisted bicycle in accordance with a first embodiment of the invention.
Figure 11:
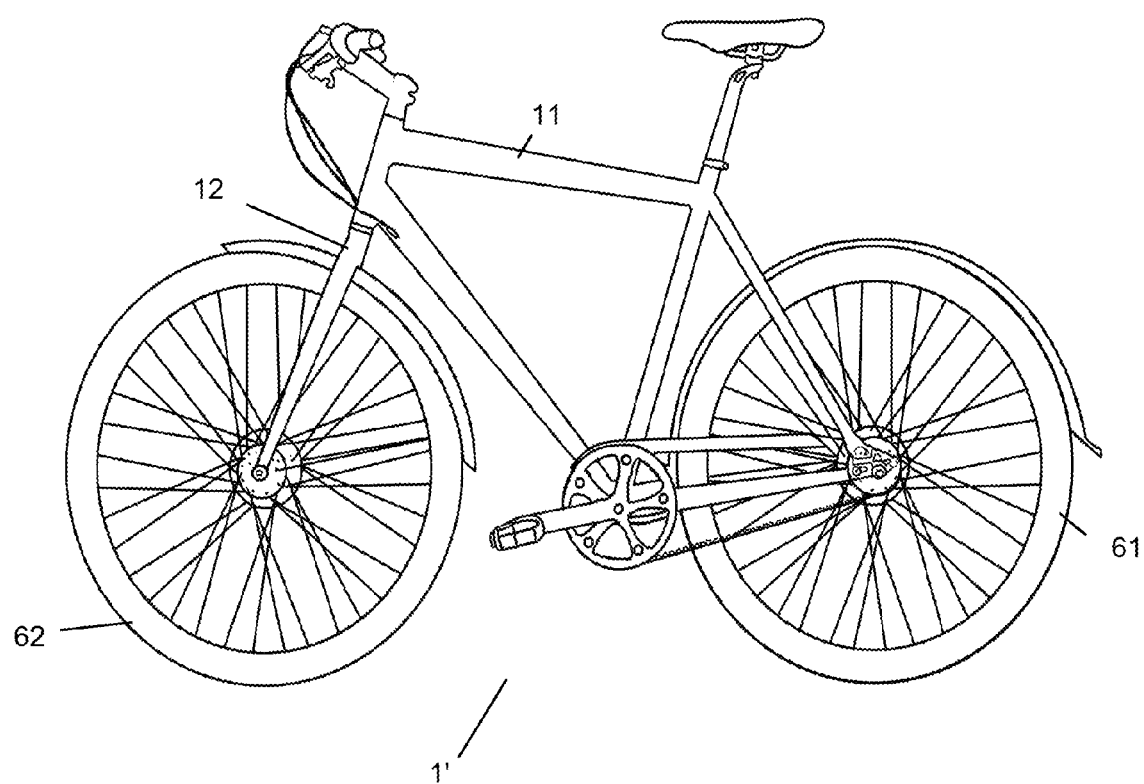
FIG. 11: diagrammatic side view of a conventional bicycle.

A conventional bicycle 1' is shown in FIG. 11. In FIG. 1 are seen the principal elements of an electrically assisted bicycle in accordance with the invention. An electric machine 2 is fixed to the frame 11 of the bicycle 1 in the vicinity of a tire 5, here in the vicinity of the tire of the rear wheel 61. A source of electrical energy, here a battery 7, powers the electric machine via control means 8. The drive pinion 3 meshes tangentially with teeth 51 of the tire 5 and can therefore transmit to it a drive force that assists the cyclist.

Figure 2:
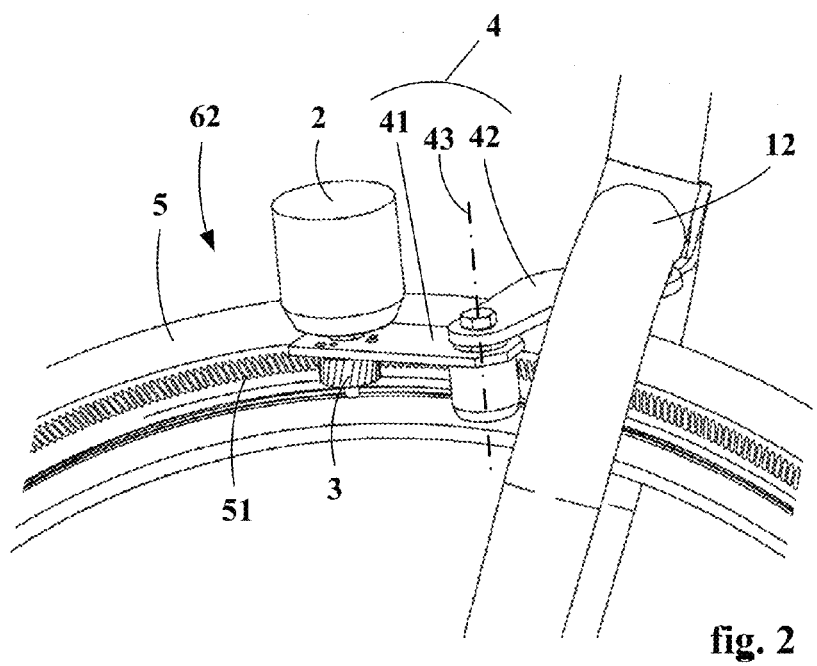
FIG. 2: more detailed diagrammatic view of a second embodiment of an electrically assisted bicycle in accordance with the invention.

FIG. 2 represents another embodiment in which the electric assist device is intended to cooperate with the tire of the front wheel 62 of the bicycle. There are seen better in this figure the fixing means 4 of the electric machine 2. The fixing means preferably comprise an oscillating arm 41 articulated to a fixed support 42 about an axis 43 substantially parallel to the shaft of the electric machine. The support 42 is fastened to the bicycle, here to the front fork 12 of the bicycle. The drive pinion 3 meshes with the teeth 51 fastened to the flank of the tire 5. The fixing means are preferably configured as here so that the transmission of a drive force by the drive pinion generates an additional dynamic force pressing the pinion onto the tire and therefore an additional radial pressure in the gears. This effect is obtained, for example, if the pivot axis 43 is as here located away from the meshing plane, toward the outside of the tire in this configuration.

Elastic means (not visible in the figures) preferably prestress the orientation of the oscillating arm so that in the absence of drive force the drive pinion 3 bears radially against the tire with a non-zero bearing force. The elastic means may for example consist of a torsion spring acting about the rotation axis 43 of the oscillating arm or a simple tension or compression spring acting directly between the oscillating arm 41 and the support 42.

Figure 3:
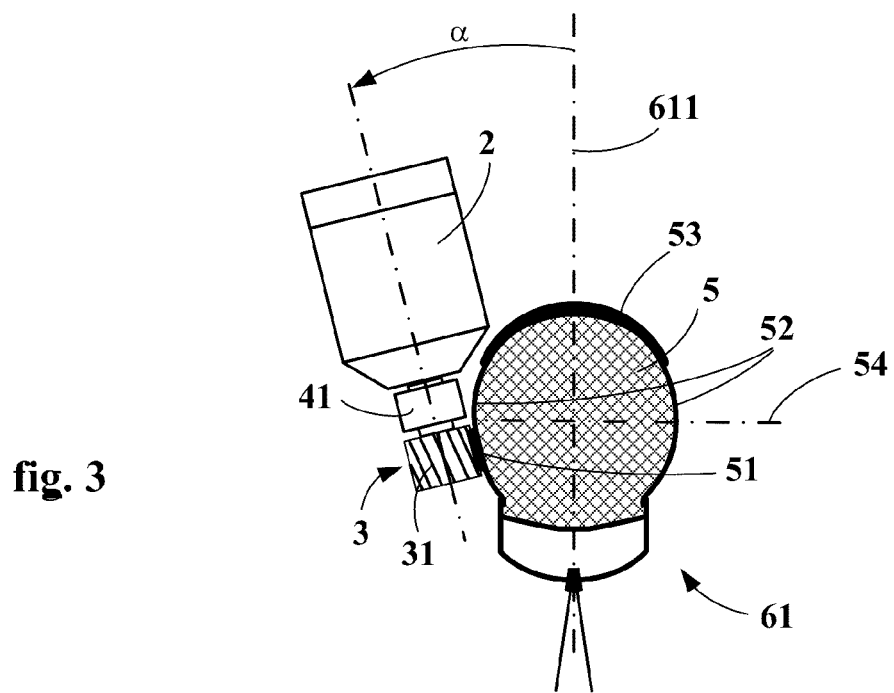
FIG. 3: diagrammatic sectional view showing the cooperation of the electric machine with the tire of an electrically assisted bicycle in accordance with the invention.

A preferred embodiment of the cooperation between the electric machine 2 and the tire 5 has been represented in FIG. 3 as seen in the plane of the wheel. The teeth 31 of the drive pinion 3 are seen to mesh tangentially with the complementary teeth 51 of the tire. The electric machine is inclined at an angle α relative to the plane 611 of the wheel 61. In accordance with the invention, the angle α may vary but is preferably between −10° and +30°. In this example a has a value of approximately 25° and the teeth 51 are fastened to a flank 52 of the tire and situated radially below the equator 54. The tire may be a pneumatic or non-pneumatic tire, or even a solid tire.

The electric machine preferably drives the drive pinion directly, that is to say with no intermediate reduction means, the pinion being carried by the shaft of the electric machine. In accordance with a preferred embodiment of the invention, a freewheel mechanism is nevertheless disposed between the shaft and the pinion so that the tire does not drive the electric machine when the bicycle is moving forward. Assuming that the device were not to comprise a freewheel, recovery of electrical energy may be effected when the cyclist brakes.

As represented in all the figures, the electric machine 2 is preferably placed radially outside the drive pinion 3 relative to the axis of the wheel of the bicycle, that is to say above the drive pinion 3 in this configuration.

Figure 4:
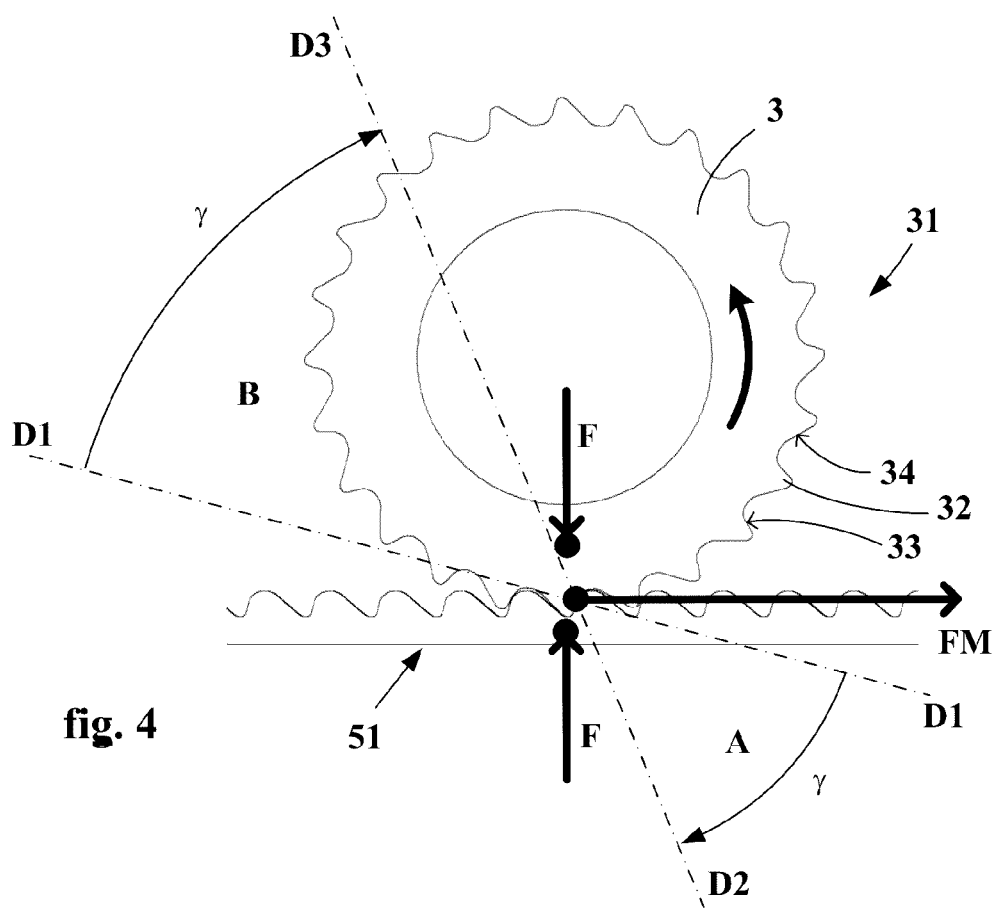
FIG. 4: detail sectional view of the meshing of the drive pinion with the teeth of the tire in accordance with a preferred embodiment of the invention.

FIG. 4 shows in detail the meshing of the drive pinion 3 with the tire. The pinion transmits a drive force FM to the tire. There is seen here a preferred embodiment in which the teeth 32 of the pinion are asymmetrical and configured so that the aperture angle of their driving faces 33 is smaller than the aperture angle of their non-driving faces 34. The shape of the complementary teeth 51 fastened to the tire is naturally adapted accordingly. This arrangement makes it possible to improve significantly the efficiency of meshing and to increase the maximum value of the drive force FM that can be transmitted. Also represented is the force F with which the pinion bears on the tire. This force is transmitted by the fixing means of the electric machine and has the effect of maintaining meshing even in the event of deformation of the various elements of the device. If F0 denotes the bearing force of the pinion in the absence of drive force and FD denotes the additional dynamic force generated by the effect of the drive force, it may be stated that F=F0+FD.

Figure 6:
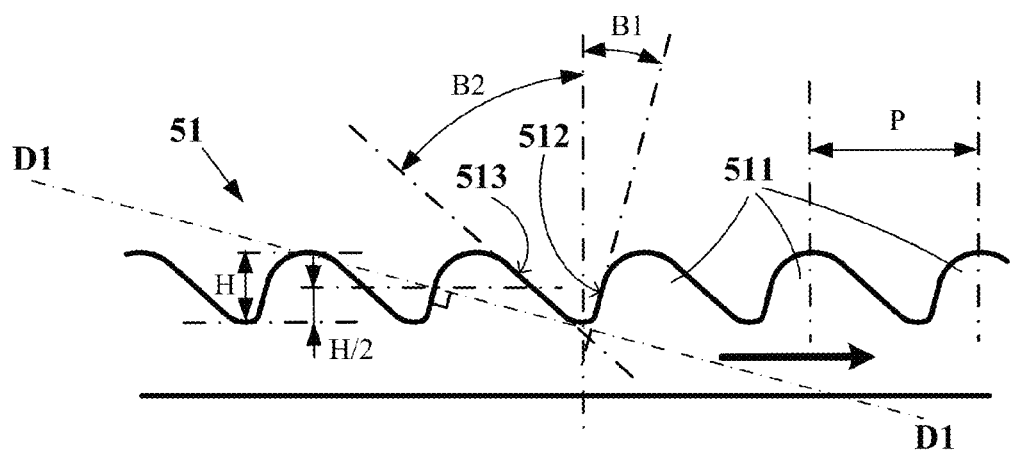
FIG. 6: diagrammatic sectional detail view of teeth of a preferred embodiment of a tire in accordance with the invention.

The straight line D1 is the straight line perpendicular to the tangent to the teeth at the point of contact at the mid-height of the teeth (see also FIG. 6). The half-lines D2 and D3 diverge from D1 at an angle γ. The sector A corresponds to the surface between the straight line D1 and the half-line D2. The sector B corresponds to the surface between the straight line D1 and the half-line D3. The angle γ preferably does not exceed 60°. One way of ensuring that the drive force generates an additional dynamic bearing force is to verify that the position of the intersection of the axis 43 with the median plane of the pinion complies with one of the following conditions:

If the axis 43 is to the front of the pinion relative to the direction of forward movement of the bicycle (situation represented in FIG. 1), the intersection must be situated in the sector A represented in FIG. 4.

If the axis 43 is to the rear of the pinion relative to the direction of forward movement of the bicycle (situation represented in FIG. 2), the intersection must be situated in the sector B represented in FIG. 4.

The teeth 31 of the pinion 3 have been represented to a larger scale in FIG. 5 in order to show better the preferred asymmetrical embodiment described with reference to FIG. 4. It is seen that the aperture angle A1 of the driving faces 33 is substantially smaller than the aperture angle A2 of the non-driving faces 34.

The teeth 51 of the tire have been represented to a larger scale in FIG. 6 in order to show better a preferred embodiment. According to the same logic as for the drive pinion, the teeth 511 of the tire have driving faces 512 and non-driving faces 513. It is seen that the aperture angle B1 of the driving faces 512 is substantially smaller than the aperture angle B2 of the non-driving faces 513. The teeth have a pitch P and a height H. The pitch of the teeth is preferably between 1.8 mm and 5.5 mm and more preferably between 1.8 mm and 2.5 mm in order to minimize the noise emitted by the gears. The straight line D1 referred to above with reference to FIG. 4 has also been represented in this figure.

Figure 5:
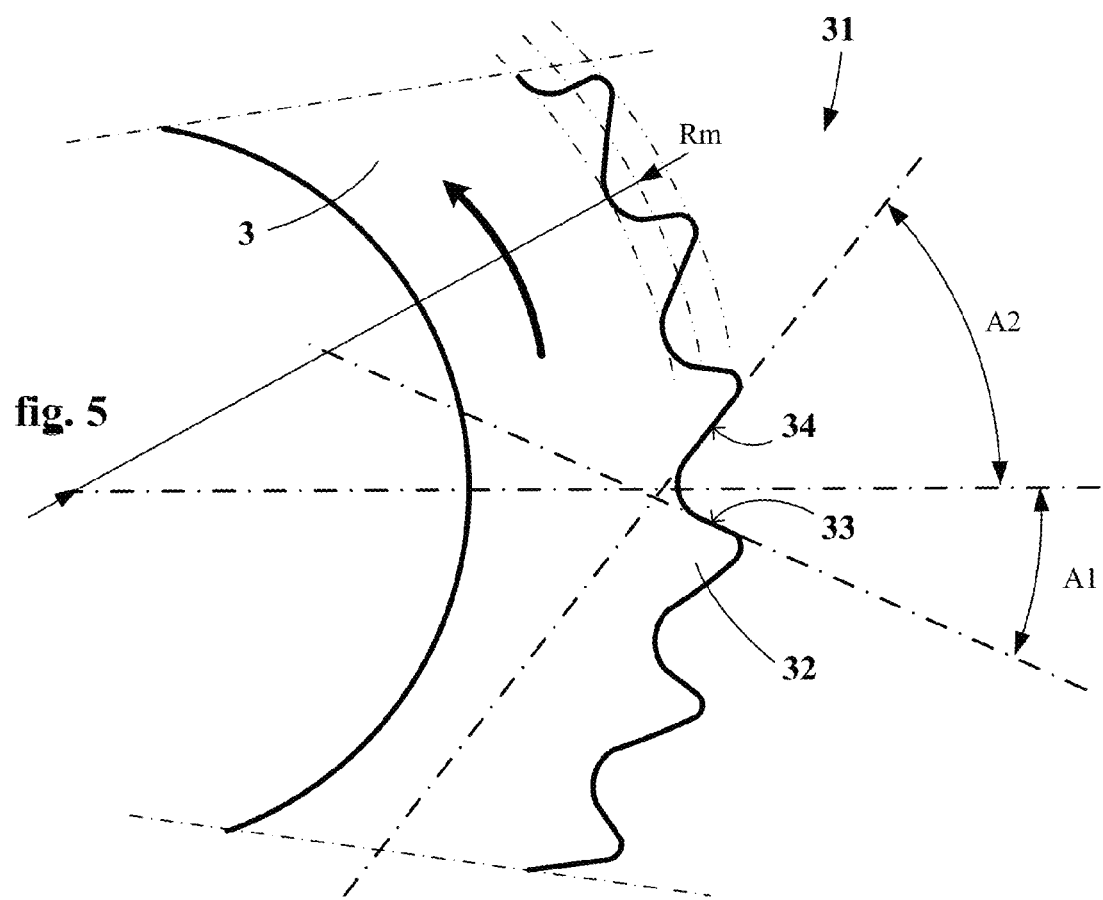
FIG. 5: diagrammatic sectional detail view of the teeth of the drive pinion from FIG. 4.

FIGS. 5 and 6 show teeth having rectilinear faces. In the case of curved faces, the angles described above must be measured considering the tangent at the point corresponding to the tooth half-height (see the mean radius Rm in FIG. 5 and the half-height H/2 in FIG. 6).

Figure 7:
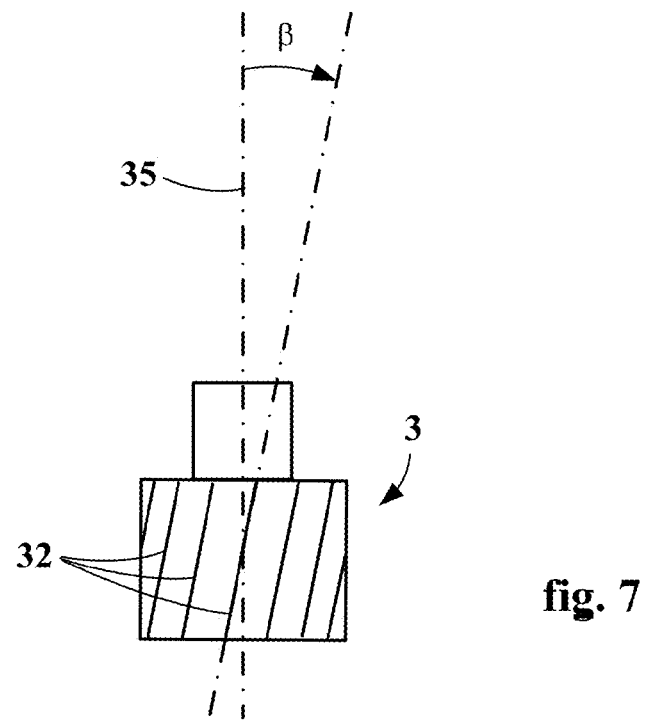
FIG. 7: side view of a drive pinion with helicoidal teeth in accordance with a preferred embodiment of the device of the invention.

The drive pinion 3 and an essential feature of the invention in which the teeth are helicoidal teeth have been represented to a larger scale in FIG. 7. The axis of the teeth 32 is inclined at angle β relative to the axis 35 of the pinion and therefore relative to the shaft of the electric machine. The angle β shown here is approximately 15°, but it may for example be between 4° and 40° and preferably between 15° and 30° in order to minimize noise without excessively degrading the maximum value of the drive force FM that can be transmitted. The inclination of the teeth of the tire must naturally be adapted accordingly. This arrangement makes it possible in particular to limit the noise emitted by the gears. The drive pinion 3 is preferably made of metal, for example steel. Where appropriate, the freewheel referred to above may be integrated into the interior of the pinion.

Figure 8:
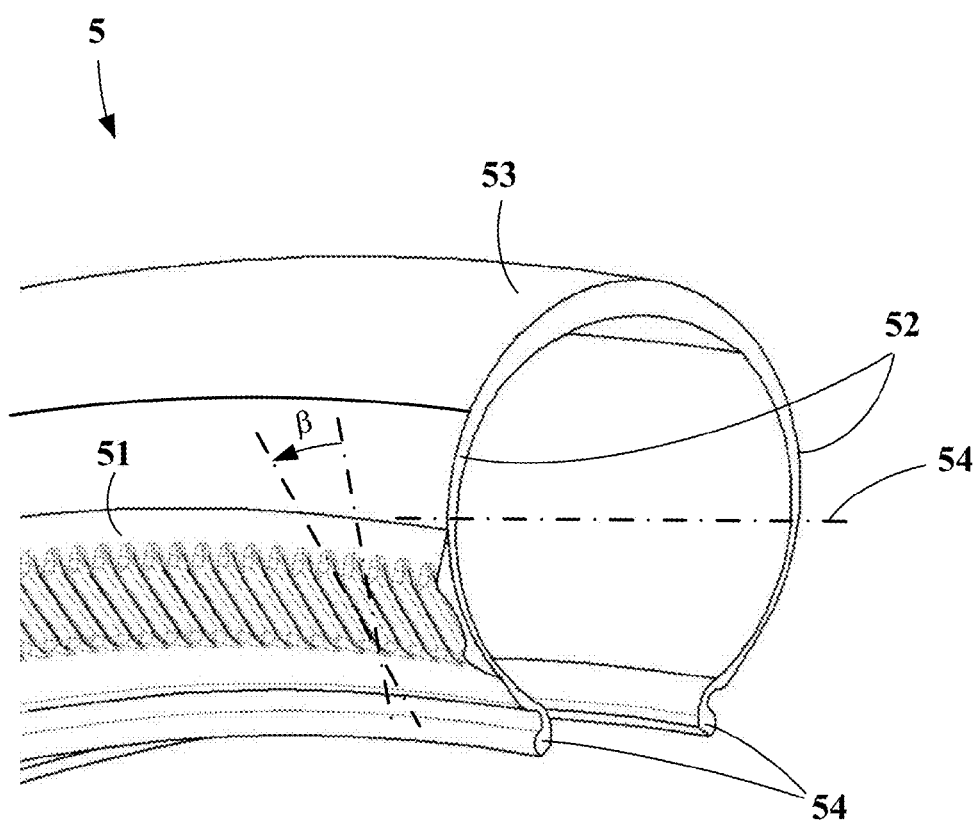
FIG. 8: sectional perspective view of a pneumatic tire equipping a bicycle in accordance with the invention.

In FIG. 8 there is seen a preferred embodiment of the tire 5. Here it is a pneumatic tire comprising in the manner known in itself flanks 52, a tread 53 and beads 54 for attaching it to a bicycle rim that is not shown. It is also seen that the teeth 51 fastened to the flank are inclined relative to the radial direction of the tire at an angle corresponding to the helix angle β for the drive pinion described with reference to FIG. 7.

The teeth of the tire preferably consist of rubber with a Shore A hardness preferably between 55 and 85 and more preferably between 75 and 85 to favour the maximum value of the drive force FM that can be transmitted. The teeth are preferably moulded at the same time as the pneumatic tire but may also be attached to a conventional tire moulded beforehand.

A textile reinforcement may be associated with the surface of the teeth in order to limit wear by abrasion and tooth noise. It is advantageously to use polyamide type textile reinforcement fabric, woven so as to be extendable when moulding the teeth.

As already represented in FIG. 3, the teeth 51 are preferably placed radially below the equator 54 of the tire 5. Alternatively, the teeth may be placed at the shoulder of the tire, that is to say in the vicinity of the tread 53, or even at the centre of the tread 53, in a horizontal position.

Figure 9:
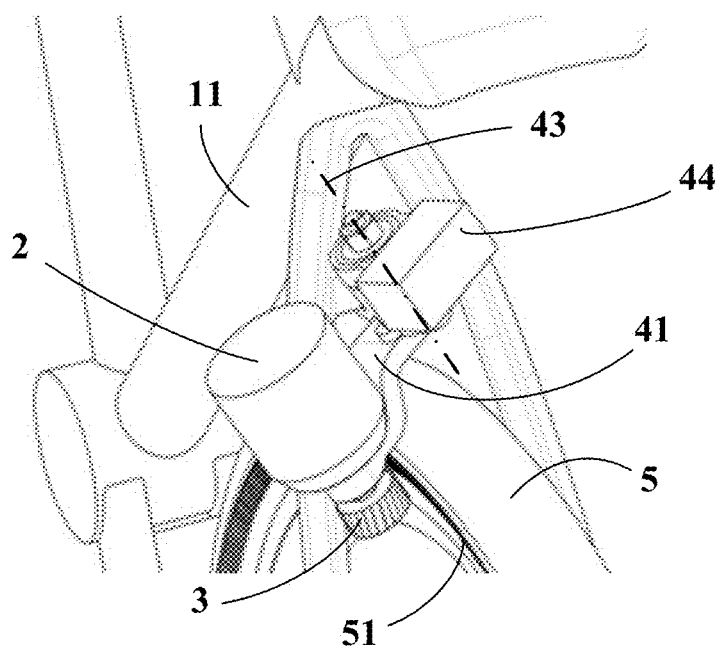
FIG. 9: diagrammatic perspective view of a detail of a preferred embodiment of the electric assist device in accordance with the invention.
Figure 10:
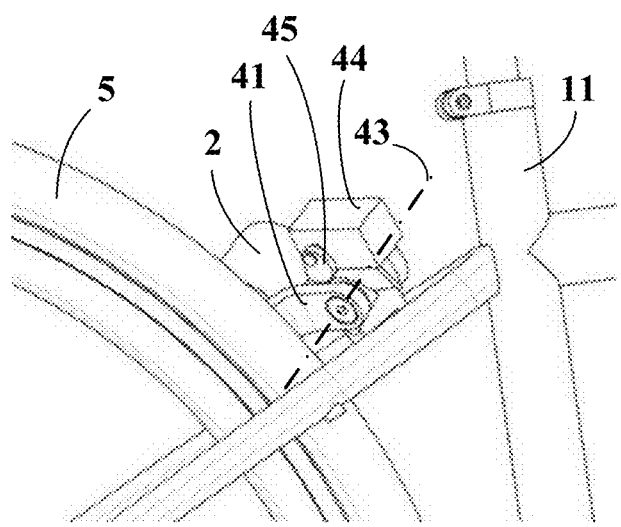
FIG. 10: diagrammatic perspective view of the FIG. 9 embodiment from a different point of view.

In FIGS. 1 to 4, the device is represented in the working position. In FIGS. 9 and 10 there has been represented an embodiment of the invention in which the electric machine can be held in a folded position, that is to say away from the tire, by an electric actuator 44. In this example, the actuator includes a cam 45 coming to bear against the oscillating arm 41. Rotation of the cam causes the drive pinion to be moved away from the tire and therefore disengagement of the device. The actuator may be a servomotor or an electromagnet, for example.

The folded position enables totally silent functioning of the bicycle in non-assisted mode.

The actuator may be controlled automatically as a function of various parameters such as the speed of the bicycle, the pedalling, the state of charge of the battery. The actuator may equally be controlled by the cyclist, for example by means of the display and control unit.

Of course the pinion may equally be manually disengaged directly at the level of the oscillating arm or by means of a cable connected to a control accessible to the cyclist.

The presence of a freewheel mechanism in the device of the invention in combination with such disengagement means further makes it possible to bring about meshing smoothly even when the bicycle is moving.

The invention claimed is:

1. An electrical assist device for a bicycle, the device comprising:
    an electric machine that includes a rotor;
    a drive pinion structured to be driven by the rotor of the electric machine, the drive pinion including helicoidal teeth;
    a fastener structured to include a first portion that articulatingly carries the electric machine and a second portion that is fastened to the bicycle in a fixed position in a vicinity of a tire of a wheel of the bicycle, the first portion being arranged to pivot about a pivot axis with respect to the second portion; and
    a source of electrical energy for powering the electric machine,
    wherein the helicoidal teeth of the drive pinion are structured to mesh tangentially with complementary teeth attached to the tire, and
    wherein an axis of the electric machine is at an inclined angle relative to a plane of the wheel of the bicycle when the electric machine is in a working position.

2. The electrical assist device according to claim 1, wherein the helicoidal teeth of the drive pinion are asymmetrical teeth that include driving faces and non-driving faces, and wherein an aperture angle of the driving faces is smaller than an aperture angle of the non-driving faces.

3. The electrical assist device according to claim 2, wherein the drive pinion is driven by the electric machine via a freewheel so that the tire does not drive the electric machine when the bicycle is moving forward.

4. The electrical assist device according to claim 1, further comprising a display and control interface that enables a cyclist to interact with a controller that controls the electric machine.

5. The electrical assist device according claim 4, further comprising a pedalling sensor connected to the controller.

6. The electrical assist device according claim 1, wherein the fastener includes an oscillating arm, corresponding to the first portion, articulated to a support portion corresponding to the second portion, the oscillating arm being arranged to pivot about the pivot axis with respect to the support portion, and the support portion and the oscillating arm being arranged so that a drive force transmitted to the tire by the drive pinion generates a radial pressure in gears of the drive pinion.

7. The electrical assist device according to claim 6, wherein an elastic spring prestresses an orientation of the oscillating arm so that, in an absence of the drive force, the drive pinion presses radially against the tire with a non-zero bearing force.

8. The electrical assist device according claim 1, wherein the fastener defines at least two positions of the electric machine relative to the tire, the at least two positions including the working position, at which the drive pinion meshes with the teeth of the tire, and a folded position, at which the drive pinion is held away from the tire.

9. An electrical assist kit for a bicycle, the kit comprising:
   a pneumatic tire having teeth attached thereto; and
   an electrical assist device for the bicycle, the device including:
      an electric machine that includes a rotor,
      a drive pinion structured to be driven by the rotor of the electric machine, the drive pinion including helicoidal teeth,
      a fastener structured to include a first portion that articulatingly carries the electric machine and a second portion that is fastened to the bicycle in a fixed position in a vicinity of a tire of a wheel of the bicycle, the first portion being arranged to pivot about a pivot axis with respect to the second portion, and
      a source of electrical energy for powering the electric machine,
   wherein the helicoidal teeth of the drive pinion are structured to complement the teeth attached to the tire, and the helicoidal teeth of the drive pinion are structured to mesh tangentially with the teeth attached to the tire, and
   wherein an axis of the electric machine is at an inclined angle relative to a plane of the wheel of the bicycle when the electric machine is in a working position.

10. The electrical assist kit according to claim 9, wherein the teeth attached to the tire are positioned on a flank of the tire.

11. The electrical assist kit according to claim 10, wherein the teeth attached to the tire are asymmetric teeth that include driving faces and non-driving faces, and wherein an aperture angle of the driving faces is smaller than an aperture angle of the non-driving faces.

12. The electrical assist kit according to claim 9, wherein a pitch of the teeth attached to the tire is between 1.8 mm and 5.5 mm, with between 1.8 mm and 2.5 mm being preferable for the pitch.

13. A bicycle comprising:
   a pneumatic tire having teeth attached thereto; and
   an electrical assist device for the bicycle, the device including:
      an electric machine that includes a rotor,
      a drive pinion structured to be driven by the rotor of the electric machine, the drive pinion including helicoidal teeth,
      a fastener structured to include a first portion that articulatingly carries the electric machine and a second portion that is fastened to the bicycle in a fixed position in a vicinity of a tire of a wheel of the bicycle, the first portion being arranged to pivot about a pivot axis with respect to the second portion, and
      a source of electrical energy for powering the electric machine,
   wherein the helicoidal teeth of the drive pinion are structured to complement the teeth attached to the tire, and the helicoidal teeth of the drive pinion are structured to mesh tangentially with the teeth attached to the tire, and
   wherein an axis of the electric machine is at an inclined angle relative to a plane of the wheel of the bicycle when the electric machine is in a working position.

14. The bicycle according to claim 13, wherein the tire is mounted on a rear wheel of the bicycle.

* * * * *

UNITED STATES PATENT AND TRADEMARK OFFICE
CERTIFICATE OF CORRECTION

PATENT NO. : 9,475,546 B2
APPLICATION NO. : 14/649960
DATED : October 25, 2016
INVENTOR(S) : David Olsommer et al.

Page 1 of 1

It is certified that error appears in the above-identified patent and that said Letters Patent is hereby corrected as shown below:

In the Specification

Column 2
Line 65, "detail sectional" should read --detailed sectional--.

Column 3
Line 1, "sectional detail" should read --detailed sectional--.
Line 3, "sectional detail" should read --detailed sectional--.

Column 4
Line 4, "a has a" should read --α has a--.

Column 5
Line 48, "It is advantageously" should read --It is advantageous--.

In the Claims

Column 6
Line 48, "according claim 4," should read --according to claim 4,--.
Line 50, "according claim 1," should read --according to claim 1,--.
Line 64, "according claim 1," should read --according to claim 1,--.

Signed and Sealed this
Seventeenth Day of October, 2017

Joseph Matal
*Performing the Functions and Duties of the
Under Secretary of Commerce for Intellectual Property and
Director of the United States Patent and Trademark Office*